United States Patent
Wang et al.

(10) Patent No.: US 9,288,029 B2
(45) Date of Patent: Mar. 15, 2016

(54) METHOD AND APPARATUS FOR ADAPTIVE CHANNEL DIRECTION INFORMATION FEEDBACK IN A HETEROGENEOUS SYSTEM

(71) Applicant: NEC (CHINA) CO., LTD., Beijing (CN)

(72) Inventors: Gang Wang, Beijing (CN); Ming Lei, Beijing (CN); Fang Yuan, Beijing (CN); Chenyang Yang, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 14/385,027

(22) PCT Filed: Sep. 21, 2012

(86) PCT No.: PCT/CN2012/081765
§ 371 (c)(1),
(2) Date: Sep. 12, 2014

(87) PCT Pub. No.: WO2014/043896
PCT Pub. Date: Mar. 27, 2014

(65) Prior Publication Data
US 2015/0256317 A1 Sep. 10, 2015

(51) Int. Cl.
*H04L 5/00* (2006.01)
*H04B 7/06* (2006.01)
(Continued)

(52) U.S. Cl.
CPC .............. *H04L 5/0057* (2013.01); *H04B 7/024* (2013.01); *H04B 7/0639* (2013.01); *H04W 88/08* (2013.01)

(58) Field of Classification Search
CPC .... H04L 5/0057; H04B 7/024; H04B 7/0639; H04W 88/08
See application file for complete search history.

(56) References Cited

U.S. PATENT DOCUMENTS

2010/0091893 A1* 4/2010 Gorokhov ............. H04L 1/0026
375/260
2011/0158164 A1* 6/2011 Palanki ............. H04W 56/0015
370/328
(Continued)

FOREIGN PATENT DOCUMENTS

CN 102237950 A 11/2011
JP 2010541465 A 12/2010
(Continued)

OTHER PUBLICATIONS

International Search Report for PCT/CN2012/081765 dated May 16, 2013.
(Continued)

*Primary Examiner* — Brian D Nguyen
(74) *Attorney, Agent, or Firm* — Sughrue Mion, PLLC

(57) ABSTRACT

The present invention relates to method and apparatus for channel direction information feedback in a heterogeneous system. According to an embodiment of the present invention, a method for channel direction information feedback in a heterogeneous system comprises: determining, for a user equipment, total feedback bits for quantization of channel direction information, based on a trade off between accuracy of channel direction information quantization and reliability of uplink feedback transmission on a predetermined uplink feedback resource, wherein coordinated multi-point transmission between a local base station and a cross base station is performed for the user equipment in the heterogeneous system; and notifying said user equipment of said total feedback bits for quantization of channel direction information that will be conveyed on said predetermined uplink feedback resource. The embodiments of the present invention further relate to corresponding base station, user equipment and computer program product.

18 Claims, 7 Drawing Sheets

(51) Int. Cl.
  *H04B 7/02* (2006.01)
  *H04W 88/08* (2009.01)

(56) References Cited

U.S. PATENT DOCUMENTS

| | | | |
|---|---|---|---|
| 2011/0158335 A1* | 6/2011 | Lee | H04B 7/0452 375/260 |
| 2011/0164695 A1* | 7/2011 | Zheng | H04B 7/086 375/260 |
| 2012/0307672 A1* | 12/2012 | Liu | H04B 7/024 370/252 |

FOREIGN PATENT DOCUMENTS

| | | |
|---|---|---|
| JP | 2012505593 A | 3/2012 |
| JP | 2012085087 A | 4/2012 |
| WO | 2012/020309 A2 | 2/2012 |
| WO | 2012/040935 A1 | 4/2012 |
| WO | 2012112577 A1 | 8/2012 |

OTHER PUBLICATIONS

Written Opinion for PCT/CN2012/081765 dated May 16, 2013.
Communication dated Dec. 8, 2015 from the Japanese Patent Office in counterpart application No. 2015-511894.

* cited by examiner

METHOD AND APPARATUS FOR ADAPTIVE CHANNEL DIRECTION INFORMATION FEEDBACK IN A HETEROGENEOUS SYSTEM

CROSS REFERENCE TO RELATED APPLICATIONS

This application is a National Stage of International Application No. PCT/CN2012/081765 filed Sep. 21, 2012, the contents of which are incorporated herein by reference in their entirety.

TECHNICAL FIELD

The present invention generally relates to a wireless communication system, particularly to a method and apparatus for adaptive channel direction information (CDI) feedback in a heterogeneous system.

DESCRIPTION OF THE RELATED ART

Heterogeneous systems are promising deployments to improve cell spectral efficiency in 3GPP LTE, which have received much attention in recent years. Such systems are with small, inexpensive, low-power base stations (BS), changing the topology and architecture of traditional carefully planned cellular networks.

Depending on deployment scenario, the typical low-power BSs, hereafter referred to as pica BSs, may include: remote radio head, femto cell, relay and so on. Some of them may be placed by the operator and have open access to all users, while others may be placed by the consumer and have close access only to specific users.

Considering heterogeneous systems with open access to all users, for example, there are two types of coordinated multi-point transmission (COMP) between a macro BS and pico BS. The first is joint processing (COMP-JP), where macro BS and pica BS share their data and knowledge of channel direction information (CDI). The second is coordinated beam-forming (CoMP-CB), where macro BS and pico BS share only the knowledge of CDI. The second type of cooperation will be considered here since it requires less on the backhaul connections between macro BS and pico BS.

To perform beamforming, the knowledge of CDI is essential for the heterogeneous systems. However, the knowledge of CDI is only available at the user equipments (UEs) and cannot be directly obtained by the BSs. Thus, limited feedback techniques are applied to reduce the huge overhead of feeding back the knowledge of CDI. The prior art have extensively studied the limited feedback techniques in different kinds of MIMO systems, but mostly focused on fixed codebook size for quantizing the CDI. As the uplink signal-to-noise ratio (SNR) varies from user to user, feedback capacity is different as well and fixed codebook size is not adequate any more.

It is desired to provide an improved solution of channel direction information feedback in a heterogeneous system.

SUMMARY OF THE INVENTION

To solve the problems in the prior art, one or more method and apparatus embodiments according to the present invention aim to provide an improved solution for channel direction information feedback in a heterogeneous system.

According to an aspect of the present invention, an embodiment of the present invention provides A method for channel direction information feedback in a heterogeneous system. The method comprises: determining, for a user equipment, total feedback bits for quantization of channel direction information, based on a trade off between accuracy of channel direction information quantization and reliability of uplink feedback transmission on a predetermined uplink feedback resource, wherein coordinated multi-point transmission between a local base station and a cross base station is performed for the user equipment in the heterogeneous system; notifying the user equipment of the total feedback bits for quantization of channel direction information that will be conveyed on the predetermined uplink feedback resource.

According to another aspect of the present invention, an embodiment of the present invention provides a base station in a heterogeneous system. The base station comprises: determining unit configured to determine, for a user equipment, total feedback bits for quantization of channel direction information, based on a trade off between accuracy of channel direction information quantization and reliability of uplink feedback transmission on a predetermined uplink feedback resource, wherein coordinated multi-point transmission between a local base station and a cross base station is performed for the user equipment between a local base station and a cross base station in the heterogeneous system; and notifying unit configured to notify the user equipment of the total feedback bits for quantization of channel direction information that will be conveyed on the predetermined uplink feedback resource.

According to further aspect of the present invention, an embodiment of the present invention provides an apparatus for channel direction information feedback in a heterogeneous system. The apparatus comprises: means for determining, for a user equipment, total feedback bits for quantization of channel direction information, based on a trade off between accuracy of channel direction information quantization and reliability of uplink feedback transmission on a predetermined uplink feedback resource, wherein coordinated multi-point transmission between a local base station and a cross base station is performed for the user equipment in the heterogeneous system; and means for notifying the user equipment of the total feedback bits for quantization of channel direction information that will be conveyed on the predetermined uplink feedback resource.

According to further aspect of the present invention, an embodiment of the present invention provides a method for channel direction information feedback in a heterogeneous system. The method comprises: receiving, at a user equipment, a total feedback bits for quantization of channel direction information from a local base station, wherein the total feedback bits are determined based on a trade off between accuracy of channel direction information quantization and reliability of uplink feedback transmission on a predetermined uplink feedback resource, and wherein coordinated multi-point transmission between a local base station and a cross base station is performed for the user equipment in the heterogeneous system; and feeding back to the local base station quantized channel direction information in the total feedback bits on the predetermined uplink feedback resource.

According to further aspect of the present invention, an embodiment of the present invention provides a user equipment in a heterogeneous system, for which coordinated multi-point transmission between a local base station and a cross base station is performed. The user equipment comprises: receiving unit configured to receive a total feedback bits for quantization of channel direction information from the local base station, wherein the total feedback bits are determined based on a trade off between accuracy of channel direction information quantization and reliability of uplink feedback transmission on a predetermined uplink feedback resource; and feeding-back unit configured to feed back to the local base station quantized channel direction information in the total feedback bits on the predetermined uplink feedback resource.

According to further aspect of the present invention, an embodiment of the present invention provides an apparatus for channel direction information feedback in a heterogeneous system. The apparatus comprises: means for receiving, at a user equipment, a total feedback bits for quantization of channel direction information from a local base station, wherein the total feedback bits are determined based on a trade off between accuracy of channel direction information quantization and reliability of uplink feedback transmission on a predetermined uplink feedback resource, and wherein coordinated multi-point transmission between a local base station and a cross base station is performed for the user equipment in the heterogeneous system; and means for feeding back to the local base station quantized channel direction information in the total feedback bits on the predetermined uplink feedback resource.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Figure 1:
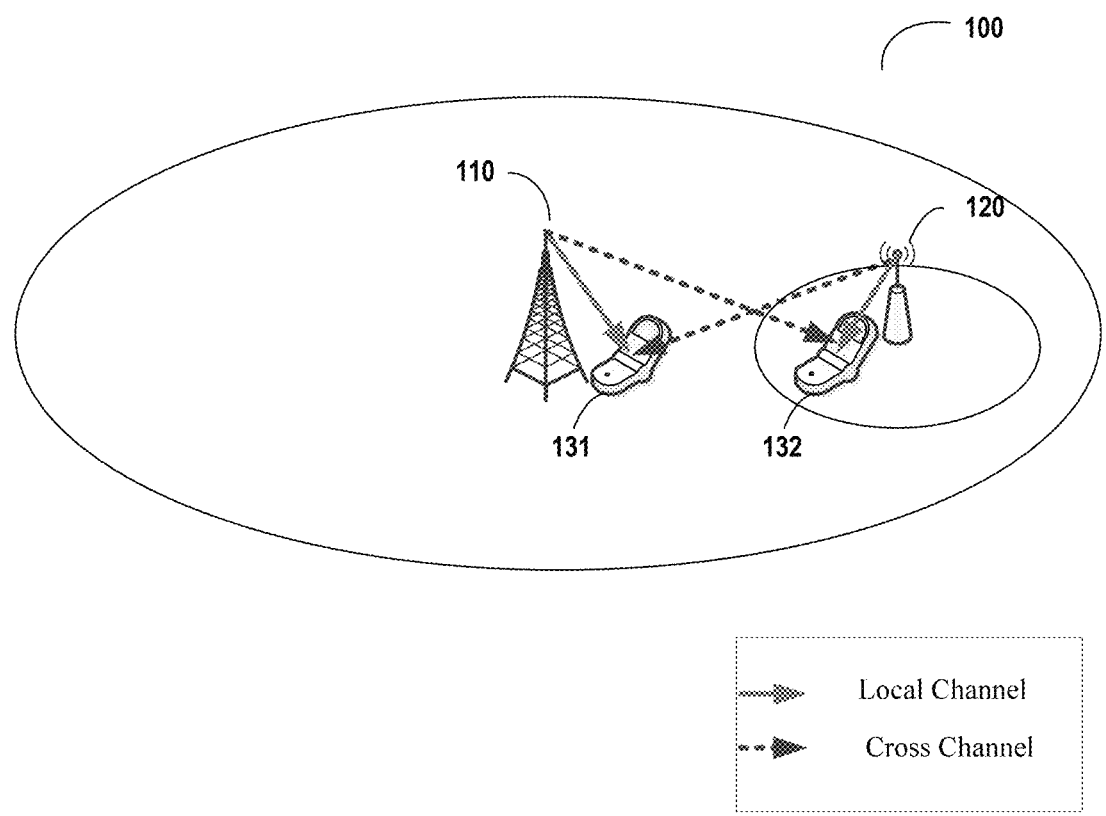
FIG. 1 schematically illustrates an example of a heterogeneous system in which embodiments according to an embodiment of the present invention can be implemented.

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Embodiments of the present invention relate to adaptive feedback techniques in heterogeneous systems. With respect to "adaptive", it means the number of feedback bits for each user changes with the uplink channel conditions. It is possible to feedback more bits through a high channel capacity in uplink than through a low channel capacity. However, while it is beneficial to feed back as many bits as possible for the sake of improving CDI quantization, the reliability of feedback transmission is simultaneously decreased because of the increased feedback load per each feedback block. To trade off between the accuracy of CDI quantization and the reliability of feedback transmission, the total feedback bit number is optimized by taking explicitly into account the uplink channel conditions in various embodiments of the present invention.

One key feature of heterogeneous systems is that users are usually with unequal signal-to-noise ratio (SNR) in the channel from two coordinated BSs. This is due to not only the path loss, but also the transmit power associated with macro BS and pico BS are not equal. Another key feature is that the macro BS and pica BS are usually not equipped with identical number of antennas due to the cost. Typically, macro BS has more antennas than the pico BS does. Therefore, equal allocation of feedback bits to the local and cross channel is not optimal.

According to some embodiments of the present invention, total feedback bits are optimized for each user equipment. Given the available feedback channel resources (e.g., blocks), the total feedback bit number conveyed by these feedback channel resources are optimized based on a trade off between the accuracy of CDI quantization and the reliability of feedback transmission.

According to some embodiments of the present invention, bits for quantizing the CDI of local and cross channel are allocated respectively from the determined total feedback bits. The embodiments of the present invention provide an optimal algorithm of low complexity to allocate the bits for quantizing the CDI of local and cross channel by exploiting the heterogeneity feature of heterogeneous systems, i.e., unequal signal power in local and cross channel and non-identical number of antenna at the macro BS and pico BS.

FIG. 1 schematically illustrates an example of a wireless communication system in which embodiments according to an embodiment of the present invention can be implemented.

Referring to FIG. 1, a heterogeneous system 100 as shown consists of a macro BS 110 and at least one pico BS 120. The pico BS 120 can be connected with the macro BS 110 via backhaul, for example optical fiber. It should be noted that although referred as to "pico BS" here, the "pico BS" according to the embodiments of the present invention can include any suitable low-power base stations such as femto base stations, relay stations, RRH nodes, etc.

A scenario is considered without loss any generality where the macro BS 110 and the pico BS 120 are both with multiple antennas and the user equipments 131 and 132 are with single antenna. The macro BS 110 and the pico BS 120 cooperatively serve multiple user equipments, for example, user equipments 131, 132. The macro BS 110 is the local BS of the user equipment 131 and the cross BS of the equipment 132, which serves the user equipment 131 through a local channel and serves the user equipment 132 through a cross channel.

The pico BS 110 is the local BS of the user equipment 132 and the cross BS of the user equipment 131, which serves the user equipment 132 through a local channel and serves the user equipment 131 through a cross channel. The CDI of local and cross channels are both feed back to respective local BS of the user equipment 131 or 132. The two BSs share channel information to eliminate mutual interference.

Let $p_d$ be the received average signal power from the local BS, which depends on the transmit power and large scale fading gain including path loss and shadowing. Let $\kappa_d p_d$ be the received average signal power from cross BS n, where $\kappa_d$ is a ratio factor between an average receive signal power from the local base station and an average receive signal power from the cross base station. The kth user equipment whose local BS is the BS l is denoted as user equipment $l_k$. The received signal at user equipment $l_k$ can be written as $$y_{l_k} = \sqrt{p_d}\, h_{l_k,l}^H v_{l_k} d_{l_k} + \sum_{m=1, m \neq k}^{K_l} \sqrt{p_d}\, h_{l_k,l}^H v_{l_m} d_{l_m} + \sum_{j=1}^{K_n} \sqrt{\kappa_d p_d}\, h_{l_k,n}^H v_{n_j} d_{n_j} + z_{l_k} \quad (1)$$

where $h_{l_k,l}$ and $h_{l_k,l}$ respectively denotes the channel vectors from BS l and BS n to user equipment $l_k$, which are referred as the local channel and cross channel in the following, $v_{l_k}$ and $d_{l_k}$ are respectively the precoder and data at BS l, $K_l$ and $K_n$ are the number of users served by BS l and BS n, and the white noise $z_{l_k}$ is with unit variance, $(\;)^H$ denotes a transpose-conjugate operation. In equation 1), the second term is the multiuser interference (MUI) and the third term is the inter-cell interference (ICI) between the macro and pico cells. It can be assumed that the channels subject to identical and independently distributed (i.i.d.) flat Rayleigh fading, where each element in the channel vector is with unit variance. Zero forcing (ZF) precoding at each BS can be considered to null the interference between the users and $K_l + K_n \leq \min\{N_l, N_n\}$, where $N_l$ and $N_n$ are respectively the antenna number of BS l and BS n.

The user equipments, such as the user equipments 131, 132, may have CDI after downlink channel estimation. The CDI of each user equipment is firstly quantized through a given codebook with proper size, and then the indices of the quantized CDIs of local and cross channels of the user are fed back to its local DS via uplink transmission.

With reference to FIGS. 2-7, various embodiments of the present invention will be described in details.

Figure 2:
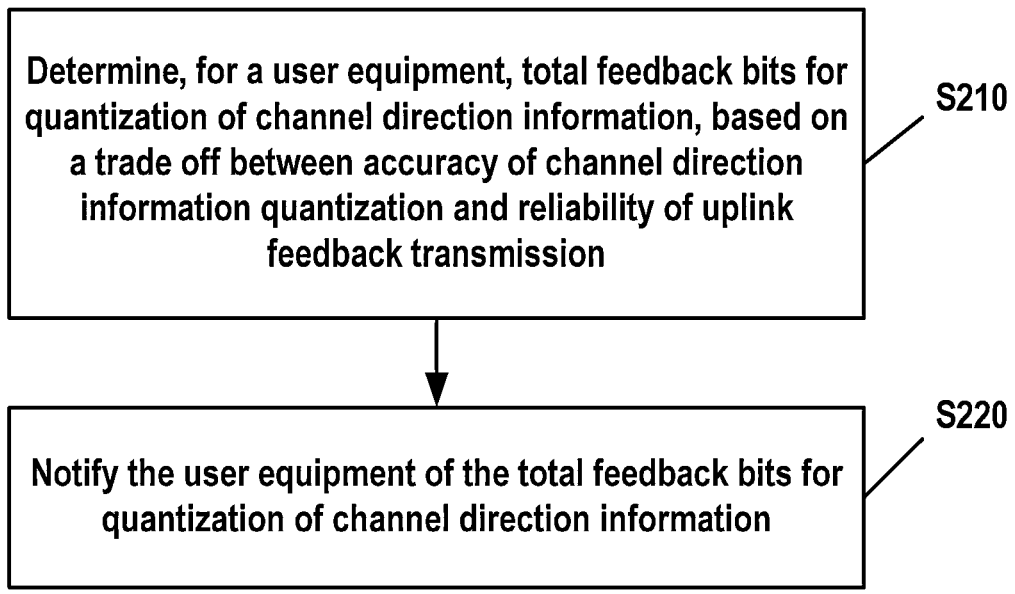
FIG. 2 schematically illustrates a flow chart of a method for operating a base station in a heterogeneous system according to an embodiment of the present invention.

FIG. 2 schematically illustrates a flow chart of a method for operating a base station in a heterogeneous system according to an embodiment of the present invention.

In step S210, total feedback bits for quantization of CDI are determined for a user equipment based on a trade off between accuracy of channel direction information quantization and reliability of uplink feedback transmission on a predetermined uplink feedback resource.

According to an exemplary embodiment of the present invention, the average CDI distortion led by quantization is depends on the employed codebooks, but can be approximated as $$Q_l = \frac{N_l - 1}{N_l} 2^{-\frac{B_l}{N_l - 1}}, \quad (2)$$

$$Q_n = \frac{N_n - 1}{N_n} 2^{-\frac{B_n}{N_n - 1}} \quad 3)$$

where $B_l$ is the bit number for quantizing the CDI of local channel and $B_n$ are the bit number for quantizing the CDI of cross channel.

After quantization, both the local and cross CDIs of each user equipment are fed back to its local BS. It can be assumed assume that the available feedback resources in uplink consist of a total of $\beta_{sum}$ blocks and each block corresponds to a coherent time and bandwidth specified by the system. Moreover, the uplink channel subjects to block fading and are constants over these blocks when feedback. Assume each block conveys a part of $B_0$ bits. Then, the total number of feedback bits can be represented by $\beta_{sum} B_0$, which are divided into two parts: $B_l$ for the local channel and $B_n$ for the cross channel, with sum constraint $B_l + B_n + \beta_{sum} B_0$.

Because of channel fading, the instantaneous uplink capacity may not be large enough to reliably feed back these $\beta_{sum} B_0$ bits. The outage probability when uplink subjects to a block i.i.d. flat Rayleigh fading can be expressed as $$P = Pr\{\beta_{sum} \log_2(1 + \gamma) < \beta_{sum} B_0\} \quad 4)$$
$$= Pr\{\log_2(1 + \gamma) < B_0\}$$
$$= \int_0^v \frac{\gamma^{N_l - 1} e^{-\gamma/p_u}}{p_u^{N_l} \Gamma(N_l)} d\gamma \triangleq P(v)$$

where $v = 2^{B_0} - 1$ is the threshold function led by $B_0$, and $p_u$ denotes the uplink receive signal power, $\Gamma(N_l)$ is the Gamma function with parameter $N_l$, $\gamma$ denotes the instantaneous uplink receiver signal energy.

Considering a worst-case estimation for any well-designed method for index assignment, when the BS receives a wrong codeword index in the case of uplink outage, through the index re-mapping operation, its selected codeword will be independent with the codeword obtained from CDI quantization. With such random index assignment, the received CDI at the BS after feedback can be expressed as follows $$\check{h}_{l_k,l} = \begin{cases} \hat{h}_{l_k,l}; & \text{not in outage} \\ e_{l_k}; & \text{in outage} \end{cases} \quad 5)$$

where $e_{l_k}$ is a random codeword.

The average distortion of the quantized CDIs in equations 2) and 3) can be further expressed as $$Q_l = \frac{N_l - 1}{N_l}(1 + v)^{-\frac{\varphi_l \beta_{sum}}{N_l - 1}} \triangleq Q_l(v) \quad 6)$$

$$Q_n = \frac{N_n - 1}{N_n}(1 + v)^{-\frac{\varphi_n \beta_{sum}}{N_n - 1}} \triangleq Q_n(v) \quad 7)$$

where $\phi_l$ and $\phi_n$ are ratio variables of feedback bit allocation respectively for said local channel direction information and for said cross channel direction information, that is, $B_l = \phi_l \beta_{sum} B_0$, $B_n = \phi_n \beta_{sum} B_0$.

It can be appreciated that given a specific bit allocation scheme, e.g. $\phi_l$ and $\phi_n$, the CDI distortion $Q_l(v)$ and $Q_n(v)$ will be reduced if a larger threshold v which leads to a larger $\beta_{sum}B_0$ is chosen. On the other hand, a larger v will lead to a lager outage probability P(v). It suggests that the threshold v can be optimized to obtain a trade off the accuracy of CDI quantization and reliability of uplink transmission.

Therefore, according to an embodiment of the present invention, a threshold function v of feedback bits $B_0$ per block of the predetermined uplink feedback resource is determined so as to determine the total feedback bits for CDI.

From equation (1), the average achievable rate of user equipment $l_k$ can be expressed:

$$R_{l_k} = E\left\{\log_2\left(1 + \frac{p_d|h_{l_k,l}^H v_{l_k}|^2}{1 + I_{MUI} + I_{ICI}}\right)\right\} \quad 8)$$

where $I_{MUI} = \sum_{m=1,m\neq k}^{K_l} p_d |h_{l_k,l}^H v_{l_m}|^2$ and $I_{ICI} = \sum_{j=1}^{K_n} \kappa_d p_d |h_{l_k,n}^H v_{n_j}|^2$.

An exact characterization of the user rate is complicated and not available. However, by introducing a random precoder independent with all the other vectors, $v_0$, the user rate can be lower bounded as $$R_{l_k} \geq E\left\{\log_2\left(1 + \frac{p|h_{l_k,l}^H v_0|^2}{1 + I_{MUI} + I_{ICI}}\right)\right\} \quad 9)$$

where the inequality comes from the fact that the average user rate with the precoder $v_{l_k}$ computed with the quantized CDI is larger than that with the random precoder $v_0$.

By using the Jensen's inequality of $$E\{\log_2(1 + 1/x)\} \geq \log_2\left(1 + \frac{1}{E\{x\}}\right),$$

a more tractable lower bound of the average rate from equation 9) can be obtained as $$R_{l_k}^{lb} = \log_2\left(1 + \left(E\left\{\frac{1}{p_d|h_{l_k,l}^H v_0|^2}\right\} + E\left\{\frac{I_{MUI} + I_{ICI}}{p_d|h_{l_k,l}^H v_0|^2}\right\}\right)^{-1}\right) \quad 10)$$

Since for a complex Gaussian channel vector its norm is independent with its direction vector, it satisfies $$E\left\{\frac{I_{MUI} + I_{ICI}}{p_d|h_{l_k,l}^H v_0|^2}\right\} = E\left\{\frac{\sum_{m=1,m\neq k}^{K_l} |\bar{h}_{l_k,l}^H v_{l_m}|^2 + \sum_{j=1}^{K_n} \kappa_d \tau |\bar{h}_{l_k,n}^H v_{n_j}|^2}{|\bar{h}_{l_k,l}^H v_0|^2}\right\} \quad 11)$$

where $$\tau \triangleq E\left\{\frac{\|h_{l_k,n}\|^2}{\|h_{l_k,l}\|^2}\right\} = \frac{N_n}{N_l - 1}$$

Denote $$\Delta_{l_k} = \sum_{m=1,m\neq k}^{K_l} E\{|\bar{h}_{l_k,l}^H v_{l_m}|^2\} + \tau \kappa_d \sum_{j=1}^{K_u} E\{|\bar{h}_{l_k,n}^H v_{n_j}|^2\} \quad 12)$$

then $$R_{l_k}^{lb} = \log_2\left(1 + \left(E\left\{\frac{1}{p_d|h_{l_k,l}^H v_0|^2}\right\} + \Delta_{l_k} E\left\{\frac{1}{|\bar{h}_{l_k,l}^H v_0|^2}\right\}\right)^{-1}\right)$$

which is because the squared random projection $|\bar{h}_{l_k,l}^H v_0|^2$ is independent with $|\bar{h}_{l_k,l}^H v_{l_m}|^2$ and $|\bar{h}_{l_k,n}^H v_{n_j}|^2$.

Note that $$E\left\{\frac{1}{|\bar{h}_{l_k,l}^H v_0|^2}\right\}$$

and $$E\left\{\frac{1}{|h_k^H v_0|^2}\right\}$$

are constants irrespective of the CDT quantization and feedback. Therefore, in order to maximize the lower bound of the average rate $R_{l_k}^{lb}$, the term $\Delta_{l_k}$ need to be minimized.

Now the expression for each individual term of $\Delta_{l_k}$ with the CDI quantization and feedback can be obtained. The BS 1 computes the zero forcing beam forming (ZFBF) vector $v_{l_m}$ by normalizing the mth column of $(H_l H_l^H)^{-1} H_l$, where $H_l = [\hat{h}_{l_1,l}, \ldots, \hat{h}_{l_{K_l},l}, \hat{h}_{n_1,l}, \ldots, \hat{h}_{n_{K_n},l}]$. Considering that there will be outage in CDI feedback during the uplink transmission, there is $$E\{|\bar{h}_{l_k,l}^H v_{l_m}|^2\} = E\{|\bar{h}_{l_k,l}^H v_{l_m}|^2 |\check{h}_{l_k,l} = \hat{h}_{l_k,l}\}(1 - P(v)) + E\{|\bar{h}_{l_k,l}^H v_{l_m}|^2 |\check{h}_{l_k,l} \neq \hat{h}_{l_k,l}\} P(v) \quad 13)$$

When the transmission for feedback in not in outage, the received CDT $\check{h}_{l_k,l}$ is equal to the quantized CDI $\hat{h}_{l_k,l}$ as given in equation 5). Since $\hat{h}_{l_k,l} \perp v_{l_m}$ with ZFBF, there is $$E\{|\bar{h}_{l_k,l}^H v_{l_m}|^2 | \check{h}_{l_k,l} = \hat{h}_{l_k,l}\} = E\{\sin^2 \theta_{l_k,l}\} E\{|q_{l_k,l}^H v_{l_m}|^2\} \quad 14)$$
$$= \frac{Q_l(v)}{N_l - 1}$$

where $E\{|q_{l_k} v_{l_m}|^2\}$ subjects to a $\beta(1, N_l-2)$ beta distribution.

When the transmission for feedback is in outage, as shown in equation 5), the received CDI $\check{h}_{l_k,l}$ is independent with $\bar{h}_{l_k,l}$. Since $v_{l_m}$ is obtained by using the random codeword $e_{l_k}$ independent with $\bar{h}_{l_k,l}$, $|\bar{h}_{l_k,l}^H v_{l_m}|^2$ subjects to a $\beta(1, N_l-1)$ beta distribution and therefore $$\Delta_{l_k} = \left(\frac{K_l - 1}{N_l}(1 + v)^{-\frac{\varphi_l \beta_{sum}}{N_l - 1}} + \frac{K_n \kappa_d}{N_l - 1}(1 + v)^{-\frac{\varphi_n \beta_{sum}}{N_n - 1}}\right)(1 - P(v)) + \left(\frac{K_l - 1}{N_l} + \frac{K_n \kappa_d}{N_l - 1}\right) P(v), \quad 19)$$

From equations 14) and 15), equation 13) becomes $$E\{|\bar{h}_{l_k,l}^H v_{l_m}|^2 \mid \check{h}_{l_k,l} \neq \hat{h}_{l_k,l}\} = \frac{1}{N_l} \qquad 15)$$

Similarly, for the cooperated cross BS n, there is $$E\{|\bar{h}_{l_k,l}^H v_{l_m}|^2\} = \frac{Q_l(v)}{N_l - 1}(1 - P(v)) + \frac{P(v)}{N_l} \qquad 16)$$

Then, from equation 12), there is $$E\{|\bar{h}_{l_k,n}^H v_{n_j}|^2\} = \frac{Q_n(v)}{N_n - 1}(1 - P(v)) + \frac{P(v)}{N_n} \qquad 17)$$

Further considering equations 5) and 6), equation 18) can be simplified as $$\Delta_{l_k} = \sum_{m=1,\neq k}^{K_l} \left\{ \frac{Q_l(v)}{N_l - 1}(1 - P(v)) + \frac{P(v)}{N_l} \right\} + \sum_{j=1}^{K_n} \kappa_d \tau \left\{ \frac{Q_n(v)}{N_n - 1}(1 - P(v)) + \frac{P(v)}{N_n} \right\} \qquad 18)$$

It can be seen that maximize the achievable data rate lower bound of user equipment $l_k$, $R_{l_k}^{lb}$, under the per user feedback constant can be formulated as $$\min_{v,\varphi_l,\varphi_n} \Delta_{l_k} \qquad 20)$$

$$\text{s.t. } v > 0, \qquad 21)$$

$$\varphi_l + \varphi_n = 1 \qquad 22)$$

$$\varphi_l \geq 0, \varphi_n \geq 0 \qquad 23)$$

Given a value of the threshold function v, from equation 19) the problem to optimize the bit allocation can be formulated as $$\min_{\varphi_l,\varphi_n} \frac{K_l - 1}{N_l}(1+v)^{-\frac{\varphi_l \beta_{sum}}{N_l - 1}} + \frac{K_n \kappa_d}{N_l - 1}(1+v)^{-\frac{\varphi_n \beta_{sum}}{N_n - 1}} \qquad 24)$$

$$\text{s.t. } \varphi_l + \varphi_n = 1 \qquad 25)$$

$$\varphi_l \geq 0, \quad \varphi_n \geq 0 \qquad 26)$$

The solution can be obtained from solving Karush-Kuhun-Tucker (KKT) condition, which turns into a water-filling algorithm with a unique solution.

The bit allocation for feeding back local and cross CDIs exploits the heterogeneity feature in the systems, i.e., unequal receive signal powers of local and channels reflected in $\kappa_d$ and nonidentical number of antenna at the macro BS and pico BS. Depending on the user equipment's location and the antenna numbers $N_n$ and $N_l$, there will be three possibilities for the allocation results.

In the condition that both local and cross CDIs are allocated with nonzero bits for feedback, explicit expressions for the optimal solution can be obtained as $$\varphi_l = \frac{N_l - 1}{N_l + N_n - 2} + \frac{(N_l - 1)(N_n - 1)}{(N_l + N_n - 2)\beta_{sum}} \log_{1+v} \frac{(N_n - 1)(K_l - 1)}{N_l K_n \kappa_d} \qquad 27)$$

$$\varphi_n = \frac{N_n - 1}{N_l + N_n - 2} + \frac{(N_l - 1)(N_n - 1)}{(N_l + N_n - 2)\beta_{sum}} \log_{1+v} \frac{N_l K_n \kappa_d}{(N_n - 1)(K_l - 1)} \qquad 28)$$

The total feedback bit number is optimized through choosing an optimal value of the threshold function v. By using the results in (27) and (28), the value of $\Delta_{l_k}$ after the feedback bit allocation can be derived as $$\Delta_{l_k,o}(v) = \bar{p}_a(1+v)^{-\beta_0}(1 - P(v)) + \bar{p}_b P(v) \qquad 29)$$

where $$\bar{p}_a = (N_l + N_n - 2)\left(\frac{\frac{K_l - 1}{N_l}}{\frac{N_l - 1}{N_l - 1}}\right)^{\frac{K_l - 1}{N_l + N_n - 2}}\left(\frac{\frac{K_n \kappa_d}{N_l - 1}}{\frac{N_l - 1}{N_n - 1}}\right)^{\frac{K_n - 1}{N_l + N_n - 2}}$$

denotes an equivalent coefficient of quantization error in said heterogeneous system, $$\beta_0 = \frac{\beta_{sum}}{N_l + N_n - 2}$$

denotes modified uplink feedback resource per each antenna, $$\bar{p}_b = \frac{K_l - 1}{N_l} + \frac{K_n \kappa_d}{N_l - 1}$$

denotes an equivalent coefficient of transmission reliability.

Then, according to an embodiment of the present invention, the suboptimal solution $v_s$ of the threshold function v can be calculated by $$v_s = \left(\frac{\bar{p}_a \beta_0 \Gamma(N_l)}{\bar{p}_b}\right)^{\frac{1}{N_l + \beta_0}} p_u^{\frac{N_l}{N_l + \beta_0}} - 1 \qquad 30)$$

Therefore, the total feedback bits for quantization of CDI can be determined as $\beta_{sum} B_0$, where $B_0 = \log_2(1+v_s)$ is rounded to the nearest integer.

At step S220, the calculated total feedback bits for quantization of CDI is sent to notify the user equipment.

Figure 3:
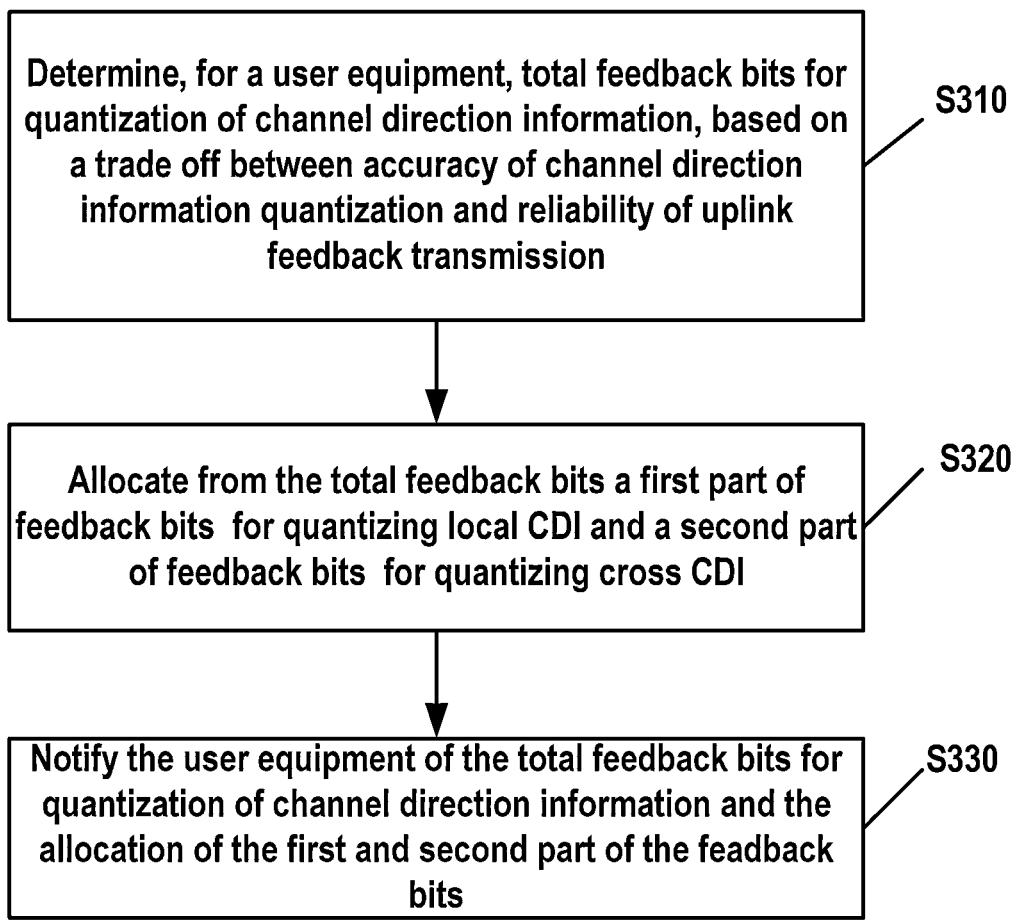
FIG. 3 schematically illustrates a flow chart of a method for operating a base station in a heterogeneous system according to another embodiment of the present invention.

FIG. 3 schematically illustrates a flow chart of a method for operating a base station in a heterogeneous system according to another embodiment of the present invention.

The flow chart as shown in FIG. 3 is same with that shown in FIG. 2 except for additional step S320.

In step S310, total feedback bits for quantization of CDI are determined for a user equipment based on a trade off between accuracy of channel direction information quantization and reliability of uplink feedback transmission on a predetermined uplink feedback resource.

According to an embodiment of the present invention, a threshold function v of feedback bits $B_0$ per block of said predetermined uplink feedback resource is determined, wherein said threshold function v is defined by $v=2^{B_0}-1$.

According to an embodiment of the present invention, a suboptimal solution $v_s$ of said threshold function v is calculated by equation 30) and therefore the total feedback bits are $\beta_{sum}B_0$, where $B_0=\log_2(1+v_s)$ is rounded to the nearest integer.

In step S320, a first part $B_l$ of feedback bits for quantizing local CDI and a second part of feedback bits $B_n$ for quantizing cross CDI are allocated from the total feedback bits.

According to an embodiment of the present invention, ratio variables $\phi_l$ and $\phi_n$ of feedback bit allocation respectively for the local CDT and for the cross CDI are determined by considering heterogeneity features of said heterogeneous system. The first part of feedback bits $B_l$ and the second part of feedback bits $B_n$ are determined by $B_l=\phi_l\beta_{sum}B_0$ and $B_n=\phi_n\beta_{sum}B_0$, which are rounded to the nearest nonnegative integers, where the radio variables $\phi_l$ and $\phi_n$ satisfy $\phi_l+\phi_n=1$.

According to an embodiment of the present invention, the radio variables $\phi_l$ and $\phi_n$ can be determined by equations 27) and 28) respectively, where the threshed function v of feedback bits $B_0$ per block of said predetermined uplink feedback resource can be optimized according to equation 30).

In step 330, the total feedback bits for quantization of CDI and the allocation of the first part and second part of the total feedback bits for local and cross channel are all sent to notify the user equipment.

Figure 4:
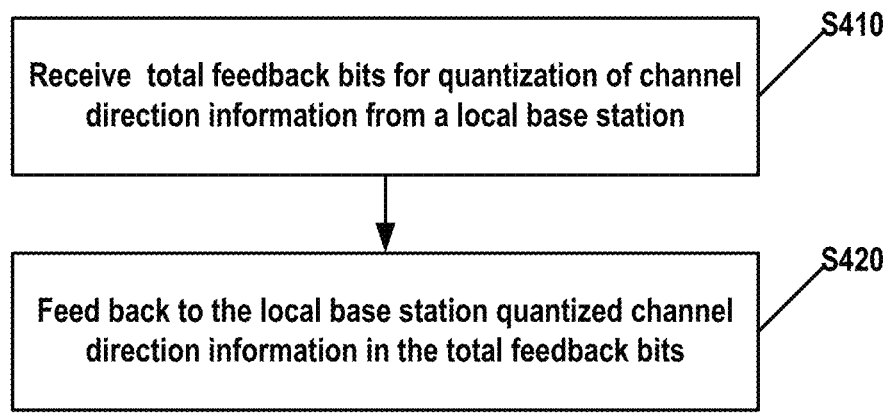
FIG. 4 schematically illustrates a flow chart of a method for operating a user equipment in a heterogeneous system according to an embodiment of the present invention.

FIG. 4 schematically illustrates a flowchart of a method for operating a user equipment in a heterogeneous system according to an embodiment of the present invention.

In step S410, the user equipment receives the total feedback bits for quantization of CDI from a local base station.

The total feedback bits are determined by the user equipment's local base station based on a trade off between accuracy of channel direction information quantization and reliability of uplink feedback transmission on a predetermined uplink feedback resource, where the user equipment performs coordinated multi-point transmission between the local base station and a cross base station in the heterogeneous system.

In step S420, the user equipment feeds back quantized CDT in the total feedback bits to the local base station on the predetermined uplink feedback resource.

Figure 5:
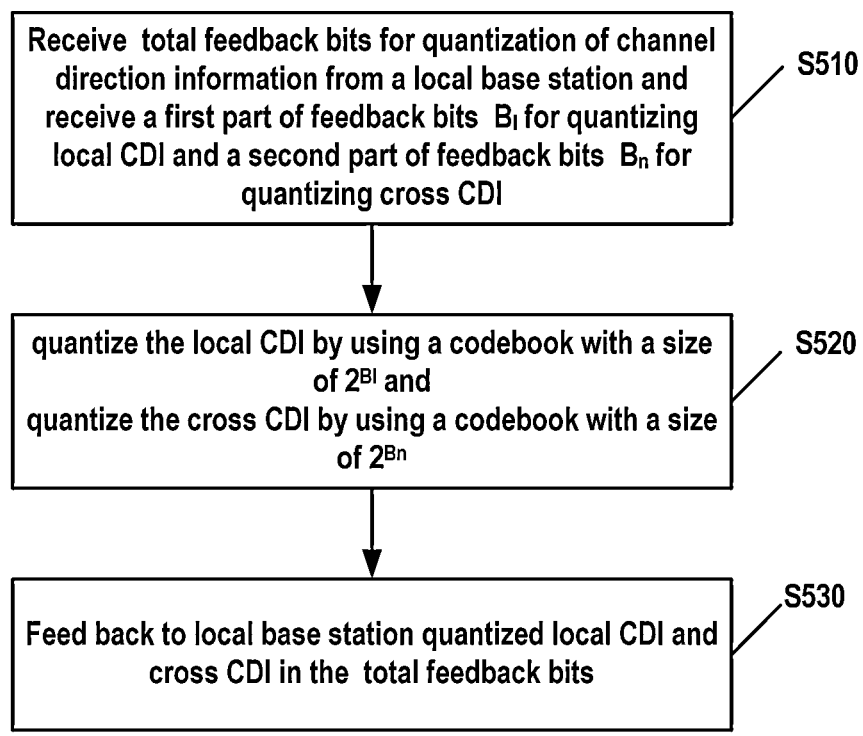
FIG. 5 schematically illustrates a flow chart of a method for operating a user equipment in a heterogeneous system according to another embodiment of the present invention.

FIG. 5 schematically illustrates a flow chart of a method for operating a user equipment in a heterogeneous system according to another embodiment of the present invention.

As shown in FIG. 5, in step S510, in addition to the total feedback bits for quantization of CDI, the user equipment further receives a first part of feedback bits $B_l$ for quantizing local CDI with respect to the local BS and a second part of feedback bits $B_n$ for quantizing cross CDI with respect to the cross BS.

In step S520, the user equipment quantizes the local CDI by using a codebook with a size of $2^{B_l}$ and the cross CDI by using a codebook with a size of $2^{B_n}$.

In step S530, the user equipment feeds back quantized local CDI and cross CDI in the total feedback bits to the local base station on the predetermined uplink feedback resource.

According to the above one or more embodiments of the present invention, the procedure of the proposed adaptive feedback scheme performs total feedback bits optimization by, for example, finding the suboptimal solution $v_s$ of the threshold function v and obtain the feedback load per block $\beta_{sum}B_0$, where $B_0=\log_2(1+v_s)$ is rounded to the nearest integer. Additionally or alternatively, bit allocation for the CDI quantization of local and cross channel is performed by, for example, finding ratio variables $\phi_l$ and $\phi_n$ of feedback bit allocation respectively for the local CDI and for the cross CDI, for example, from equations 27) and 28) based on $v_s$. The numbers of feedback bits for quantizing the local and cross CDIs of each user are respectively obtained as $B_l=\phi_l\beta_{sum}B_0$ and $B_n=\phi_n\beta_{sum}B_0$, where $B_l$ and $B_l$ are rounded to the nearest integers.

It can be seen that the embodiments of the present invention do not need any iteration or joint optimization and thus reduce the complexity of the solutions. Simulation results demonstrate that there is a significant performance gain and improvement of user rate by using the embodiments of the present invention.

The processing according to one or more embodiments of the present invention has been depicted in detail with reference to FIGS. 2-5. It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps; while the sequence of steps may be different from the depiction. For example, in some embodiments, the above one or more optional steps may be omitted. Specific embodiment of each step may be different from the depiction. All these variations fall within the spirit and scope of the present invention.

Figure 6:
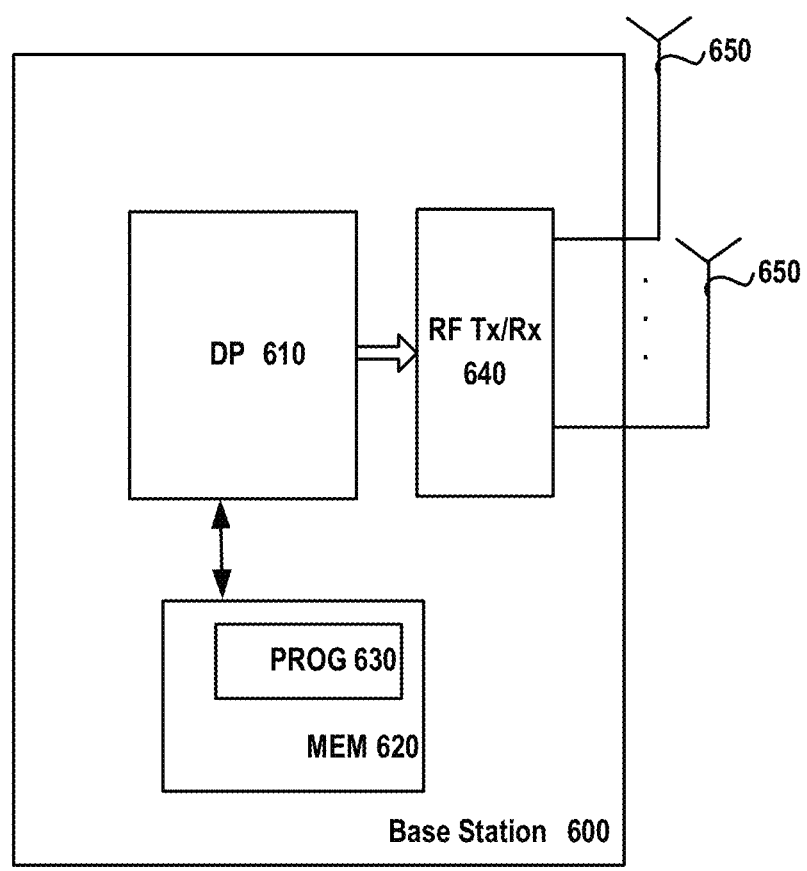
FIG. 6 schematically illustrates a block diagram of a base station according to an embodiment of the present invention.

FIG. 6 schematically shows a simplified block diagram of a base station according to an embodiment of the present invention.

The base station 600 is adapted for communication with user equipments in the wireless communication system. As discussed previously, the base station 600 can be a macro base station (e.g., macro eNB) or a pico base station (e.g., RRH node, relay station, femto base station, etc.)

The base station 600 includes a data processor (DP) 610, a memory (MEM) 620 coupled to/embedded in the DP 610, and suitable RF transmitter TX/receiver RX module 640 coupling antenna array 650 to the DP 610. The RF TX/RX module 640 is for bidirectional wireless communications with at least one UE. The MEM 620 stores a program (PROG) 630.

The PROG 630 is assumed to include program instructions that, when executed by the DP 610, enable the base station 600 to operate in accordance with the exemplary embodiments of this invention, as discussed herein with the operating procedure as shown in FIG. 2 or 3.

The MEM 620 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the base station 600, there may be several physically distinct memory units in the base station 600.

The DP 610 performs any required calculation as described with reference to FIG. 2 or 3. The DP 610 may be of any type suitable to the local technical environment, and may include one or more of general purpose computers, special purpose computers, microprocessors, DSPs and processors based on multi-core processor architecture, as non-limiting examples.

According to an embodiment of the present invention, the base station 600 comprises a receiving unit, a determining unit and a notifying unit (not shown in FIG. 6). The determining unit is configured to determine, for a user equipment, total feedback bits for quantization of CDI, based on a trade off between accuracy of channel direction information quantization and reliability of uplink feedback transmission on a predetermined uplink feedback resource, wherein coordinated multi-point transmission between the base station 600 (serving as the local BS) and a cross base station is performed for the user equipment in a heterogeneous system. The notifying unit is configured to notify the user equipment of the determined total feedback bits for quantization of CDI that will be conveyed on said predetermined uplink feedback resource. According to another embodiment of the present invention, the base station 600 further comprises an allocating unit configured to allocate from said total feedback bits a first part of feedback bits $B_l$ for quantizing local channel direction information with respect to the base station 600 and a second part of feedback bits $B_n$ for quantizing cross channel direction information with respect to the cross base station, wherein $B_l + B_n = \beta_{sum} B_0$, where $\beta_{sum}$ denotes a number of blocks consisted in said predetermined uplink feedback resource. It can be appreciated that the functionalities of the determining unit, the notifying unit and the allocating unit can be implemented by one or more suitable modules of the base station 600 as described above.

Figure 7:
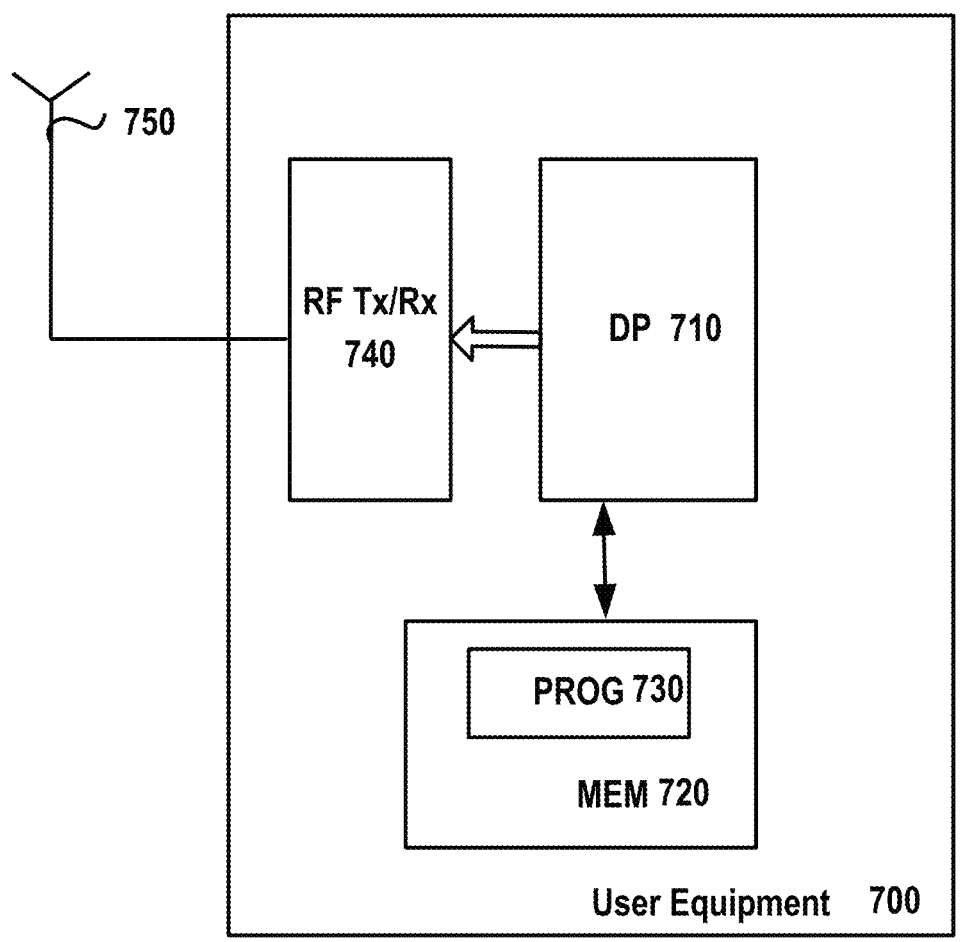
FIG. 7 schematically illustrates a block diagram of a user equipment according to an embodiment of the present invention.

FIG. 7 schematically shows a simplified block diagram of a user equipment according to an embodiment of the present invention.

In general, the various embodiments of the UE 700 can include, but are not limited to, cellular phones, PDAs having wireless communication capabilities, portable computers having wireless communication capabilities, image capture devices such as digital cameras having wireless communication capabilities, gaming devices having wireless communication capabilities, as well as portable units or terminals that incorporate combinations of such functions.

The UE 700 is adapted for performing coordinated multi-point transmission between a local base station and a cross base station in a heterogeneous system via its antenna 750.

The UE 700 includes a data processor (DP) 710, a memory (MEM) 720 coupled to/embedded in the DP 710, and suitable RF transmitter TX/receiver RX module 740 coupling the antenna array 750 to the DP 710. The RF TX/RX module 740 is for bidirectional wireless communications with at least one base station. The MEM 720 stores a program (PROG) 730.

The PROG 730 is assumed to include program instructions that, when executed by the DP 710, enable the UE 700 to operate in accordance with the exemplary embodiments of this invention, as discussed herein with the operating procedure of a user equipment as shown in FIG. 4 or 5.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the UE 700, there may be several physically distinct memory units in the UE 700.

The DP 710 performs any required calculation as described with reference to FIG. 4 or 5. The DP 710 may be of any type suitable to the local technical environment, and may include one or more of general purpose computers, special purpose computers, microprocessors, DSPs and processors based on multi-core processor architecture, as non-limiting examples.

According to an embodiment of the present invention, the user equipment 700 comprises a receiving unit and feeding-back unit (not shown in FIG. 7). The receiving unit is configured to receive a total feedback bits for quantization of channel direction information from the local base station, wherein the total feedback bits are determined based on a trade off between accuracy of channel direction information quantization and reliability of uplink feedback transmission on a predetermined uplink feedback resource. The feeding-back unit is configured to feed back to the local base station quantized channel direction information in the total feedback bits on the predetermined uplink feedback resource. According to another embodiment of the present invention, the receiving unit is further configured to receive a first part of feedback bits $B_l$ for quantizing local channel direction information with respect to the local base station and a second part of feedback bits $B_n$ for quantizing cross channel direction information with respect to the cross base station. The user equipment 700 may further comprises quantizing unit configured to quantize said local channel direction information by using a codebook with a size of $2^{B_l}$ and to quantize said cross channel direction information by using a codebook with a size of $2^{B_n}$. It can be appreciated that the functionalities of the receiving unit, feeding-back unit and the quantizing unit can be implemented by one or more suitable modules of the user equipment 700 as described above.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method for channel direction information feedback in a heterogeneous system, comprising:
    determining, for a user equipment, total feedback bits for quantization of channel direction information, based on a trade off between accuracy of channel direction information quantization and reliability of uplink feedback transmission on a predetermined uplink feedback resource, wherein coordinated multi-point transmission between a local base station and a cross base station is performed for said user equipment in said heterogeneous system; and
    notifying said user equipment of said total feedback bits for quantization of channel direction information that will be conveyed on said predetermined uplink feedback resource.

2. The method according to claim 1, wherein the step of determining said total feedback bits for quantization of channel direction information comprises determining a threshold function v of feedback bits $B_0$ per block of said predetermined uplink feedback resource, wherein said threshold function v is defined by $v=2^{B_0}-1$.

3. The method according to claim 2, further comprising:

allocating from said total feedback bits a first part of feedback bits $B_l$ for quantizing local channel direction information with respect to said local base station and a second part of feedback bits $B_n$ for quantizing cross channel direction information with respect to said cross base station, wherein $B_l+B_n=\beta_{sum}B_0$, where $\beta_{sum}$ denotes a number of blocks consisted in said predetermined uplink feedback resource; and notifying said user equipment of said first part of feedback bits $B_l$ and said second part of feedback bits $B_n$.

4. The method according to claim 3, wherein the step of allocating from said total feedback bits said first part of feedback bits $B_l$ and said second part of feedback bits $B_n$ further comprises:

determining ratio variables $\phi_l$ and $\phi_n$ of feedback bit allocation respectively for said local channel direction information and for said cross channel direction information, by considering heterogeneity features of said heterogeneous system; and determining said first part of feedback bits $B_l$ and said second part of feedback bits $B_n$ by $B_l=\phi_l\beta_{sum}B_0$ and $B_n=\phi_n\beta_{sum}B_0$, which are rounded to the nearest nonnegative integers, wherein said radio variables $\phi_l$ and $\phi_n$ satisfy $\phi_l+\phi_n=1$.

5. The method according to claim 4, wherein said ratio variables of feedback bit allocation $\phi_l$ and $\phi_n$ is determined by $$\varphi_l = \frac{N_l-1}{N_l+N_n-2} + \frac{(N_l-1)(N_n-1)}{(N_l+N_n-2)\beta_{sum}}\log_{1+v}\frac{(N_n-1)(K_l-1)}{N_lK_n\kappa_d};$$

$$\varphi_n = \frac{N_n-1}{N_l+N_n-2} + \frac{(N_l-1)(N_n-1)}{(N_l+N_n-2)\beta_{sum}}\log_{1+v}\frac{N_lK_n\kappa_d}{(N_n-1)(K_l-1)},$$

where $N_l$ and $N_n$ are respectively antenna numbers of said local base station and said cross base station; $K_l$ and $K_n$ are respectively numbers of user equipments served by said local base station and said cross base station; $\kappa_d$ is a ratio factor between an average receive signal power from said local base station and an average receive signal power from said cross base station, received at said user equipment.

6. The method according to claim 2, wherein the step of determining a threshold function v of feedback bits $B_0$ per block of said predetermined uplink feedback resource comprises calculating a suboptimal solution $v_s$ of said threshold function v by $$v_s = \left(\frac{\bar{p}_a\beta_0\Gamma(N_l)}{\bar{p}_b}\right)^{\frac{1}{N_l+\beta_0}} p_u^{\frac{N_l}{N_l+\beta_0}} - 1,$$

where $\bar{p}_a$ denotes an equivalent coefficient of quantization error in said heterogeneous system; $\bar{p}_b$ denotes an equivalent coefficient of transmission reliability;

$$\beta_0 = \frac{\beta_{sum}}{N_l+N_n-2}$$

is modified uplink feedback resource per each antenna; $p_u$ denotes uplink receive signal power; $\Gamma(N_l)$ is the Gamma function with parameter $N_l$; $N_l$ and $N_n$ are respectively antenna numbers of said local base station and said cross base station.

7. A base station in a heterogeneous system, comprising:

determining unit configured to determine, for a user equipment, total feedback bits for quantization of channel direction information, based on a trade off between accuracy of channel direction information quantization and reliability of uplink feedback transmission on a predetermined uplink feedback resource, wherein coordinated multi-point transmission between a local base station and a cross base station is performed for said user equipment in said heterogeneous system; and notifying unit configured to notify said user equipment of said total feedback bits for quantization of channel direction information that will be conveyed on said predetermined uplink feedback resource.

8. The base station according to claim 7, wherein said determining unit is further configured to determine a threshold function v of feedback bits $B_0$ per block of said predetermined uplink feedback resource, wherein said threshold function v is defined by $v=2^{B_0}-1$.

9. The base station according to claim 8, further comprising:

allocating unit configured to allocate from said total feedback bits a first part of feedback bits $B_l$ for quantizing local channel direction information with respect to said local base station and a second part of feedback bits $B_n$ for quantizing cross channel direction information with respect to said cross base station, wherein $B_l+B_n=\beta_{sum}B_0$, where $\beta_{sum}$ denotes a number of blocks consisted in said predetermined uplink feedback resource, wherein said notifying unit is further configured to notifying said user equipment of said first part of feedback bits $B_l$ and said second part of feedback bits $B_n$.

10. The base station according to claim 9, wherein said allocating unit is further configured to:

determine ratio variables $\phi_l$ and $\phi_n$ of feedback bit allocation respectively for said local channel direction information and for said cross channel direction information, by considering heterogeneity features of said heterogeneous system, and determine said first part of feedback bits $B_l$ and said second part of feedback bits $B_n$ by $B_l=\phi_l\beta_{sum}B_0$ and $B_n=\phi_n\beta_{sum}B_0$, which are rounded to the nearest nonnegative integers, wherein said radio variables $\phi_l$ and $\phi_n$ satisfy $\phi_l+\phi_n=1$.

11. The base station according to claim 10, wherein said allocation unit determines said ratio variables of feedback bit allocation $\phi_l$ and $\phi_n$ by $$\varphi_l = \frac{N_l-1}{N_l+N_n-2} + \frac{(N_l-1)(N_n-1)}{(N_l+N_n-2)\beta_{sum}}\log_{1+v}\frac{(N_n-1)(K_l-1)}{N_lK_n\kappa_d};$$

$$\varphi_n = \frac{N_n-1}{N_l+N_n-2} + \frac{(N_l-1)(N_n-1)}{(N_l+N_n-2)\beta_{sum}}\log_{1+v}\frac{N_lK_n\kappa_d}{(N_n-1)(K_l-1)},$$

where $N_l$ and are $N_n$ are respectively antenna numbers of said local base station and said cross base station; $K_l$ and are $K_n$ are respectively numbers of user equipments served by said local base station and said cross base station; $\kappa_d$ is a ratio factor between an average receive signal power from said local base station and an average receive signal power from said cross base station, received at said user equipment.

12. The base station according to claim 8, wherein said determining unit is further configured to calculate a suboptimal solution $v_s$ of said threshold function v by $$v_s = \left(\frac{\overline{p}_a \beta_0 \Gamma(N_l)}{\overline{p}_b}\right)^{\frac{1}{N_l+\beta_0}} p_u^{\frac{N_l}{N_l+\beta_0}} - 1,$$

where $\overline{p}_a$ denotes an equivalent coefficient of quantization error in said heterogeneous system; $\overline{p}_b$ denotes an equivalent coefficient of transmission reliability;

$$\beta_0 = \frac{\beta_{sum}}{N_l + N_n - 2}$$

is modified uplink feedback resource per each antenna; $p_u$ denotes uplink receive signal power; $\Gamma(N_l)$ is the Gamma function with parameter $N_l$; $N_l$ and $B_n$ are respectively antenna numbers of said local base station and said cross base station.

13. A method for channel direction information feedback in a heterogeneous system, comprising:
receiving, at a user equipment, total feedback bits for quantization of channel direction information from a local base station, wherein said total feedback bits are determined based on a trade off between accuracy of channel direction information quantization and reliability of uplink feedback transmission on a predetermined uplink feedback resource, and wherein coordinated multi-point transmission between said local base station and a cross base station is performed for said user equipment in said heterogeneous system; and
feeding back to said local base station quantized channel direction information in said total feedback bits on said predetermined uplink feedback resource.

14. The method according to claim 13, wherein the step of receiving said total feedback bits for quantization of channel direction information comprises receiving a first part of feedback bits $B_l$ for quantizing local channel direction information with respect to said local base station and a second part of feedback bits $B_n$ for quantizing cross channel direction information with respect to said cross base station.

15. The method according to claim 14, further comprising:
quantizing said local channel direction information by using a codebook with a size of $2^{B_l}$; and
quantizing said cross channel direction information by using a codebook with a size of $2^{B_n}$.

16. A user equipment in a heterogeneous system, for which coordinated multi-point transmission between a local base station and a cross base station is performed, said user equipment comprising:
receiving unit configured to receive a total feedback bits for quantization of channel direction information from the local base station, wherein said total feedback bits are determined based on a trade off between accuracy of channel direction information quantization and reliability of uplink feedback transmission on a predetermined uplink feedback resource; and
feeding-back unit configured to feed back to said local base station quantized channel direction information in said total feedback bits on said predetermined uplink feedback resource.

17. The user equipment according to claim 16, wherein said receiving unit is further configured to receive a first part of feedback bits $B_l$ for quantizing local channel direction information with respect to said local base station and a second part of feedback bits $B_n$ for quantizing cross channel direction information with respect to said cross base station.

18. The user equipment according to claim 17, further comprising:
quantizing unit configured to quantize said local channel direction information by using a codebook with a size of $2^{B_l}$ and to quantize said cross channel direction information by using a codebook with a size of $2^{B_n}$.

* * * * *